Aug. 25, 1931.  A. F. KIPPER  1,820,461
PILOT CONTROL FOR GAS BURNERS
Filed Aug. 10, 1927
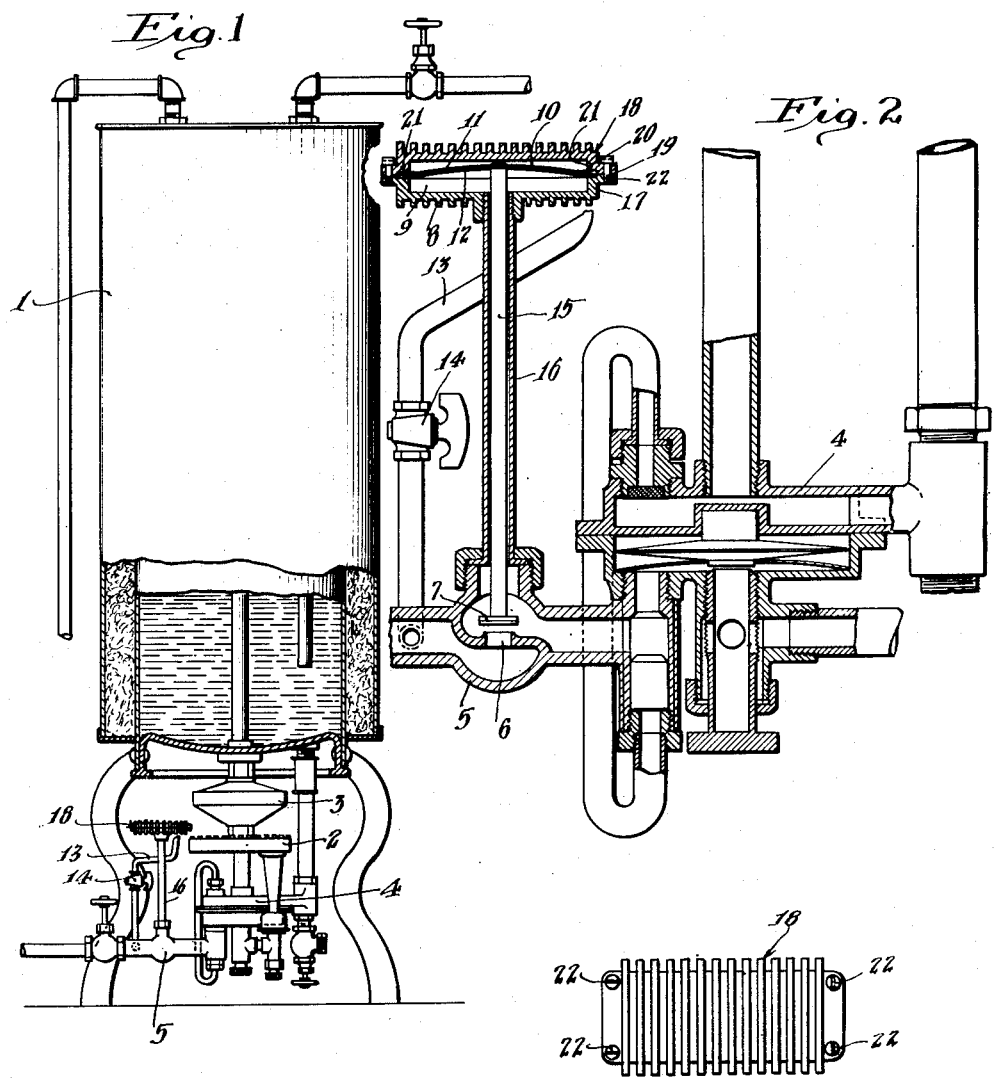

Patented Aug. 25, 1931

1,820,461

UNITED STATES PATENT OFFICE

ALLEN F. KIPPER, OF GLENDALE, CALIFORNIA, ASSIGNOR TO GENERAL WATER HEATER CORPORATION, OF LOS ANGELES, CALIFORNIA, A CORPORATION OF DELAWARE

PILOT CONTROL FOR GAS BURNERS

Application filed August 10, 1927. Serial No. 211,895.

This invention relates to a pilot-controlled device for a gas burner and particularly to the type of device which automatically shuts off the flow of gas to the burner in case the pilot flame becomes extinguished. It has been found in practice that sometimes the gas in service mains falls so low in pressure as to permit the pilot burner of a water heater to become extinguished, and later on, when the gas resumes its normal pressure, the gas will escape through the main burner which will not become ignited because the pilot burner has become extinguished. It may happen that another pilot burner, for example, in a heating furnace nearby will be located near enough to ignite this escaping gas. In this way, serious accidents have been known to occur.

Pilot controlled devices for this purpose have been employed with some success, but they usually involve the use of a considerable number of parts to multiply the movement of a thermostatic element, in this way, developing enough movement to close the valve. However, it is necessary to move a number of parts in this way to effect closing of the valve, and a considerable force must be exerted by the thermostatic element. In some instances, it is necessary to effect the closing of the valve by causing its stem to slide through a stuffing box. If the stuffing box is tight, considerable friction may be developed, and hence a considerable force must be exerted by the thermostat to move the valve stem and close the valve.

The general object of this invention is to provide a pilot controlled device of very simple construction having few parts and which can be relied upon to effect the closing of the valve, also to avoid the use of a stuffing box through which the stem of the valve must slide to close the valve. One of the objects of the invention is to provide a construction for the thermostat which will enable the thermostatic element to change its shape freely, due to changes in temperature and to connect it to the valve in such a way that there is substantially no strain or force developed by the thermostatic element in the operation of the device.

A further object of the invention is to provide a simple construction for the casing of the thermostat which will enable it to properly support the thermostatic element and will also facilitate the cooling of the thermostatic element when the pilot has become extinguished.

Further objects of the invention will appear hereinafter.

The invention consists of the novel parts and combination of parts to be described hereinafter, all of which contribute to produce an efficient pilot control for gas burners.

A preferred embodiment of the invention is described in the following specification, while the broad scope of the invention is pointed out in the appended claims.

In the drawings:

Figure 1 is a side elevation of a water heater such as used for domestic purposes, certain parts being broken away and shown in section.

Figure 2 is a vertical section through my control device and showing contiguous parts of the apparatus partially in elevation and partially in section.

Figure 3 is a plan of the casing of the thermostat of the control device.

It should be understood that this control device may be applied to a gas burner used for any purposes whatever. In the present specification, however, I have described it as applied to the gas valve for supplying gas to a water heater.

Figure 1 illustrates a common type of water heater 1 such as used for domestic purposes, the said heater being provided with a gas burner 2 below a spreader 3 and supplied with gas from a water thermostat 4. In applying my invention to such a burner, I provide a gas valve having a body 5 through which gas is delivered to the water thermostat 4. This valve 5 is provided with a port 6 with which a valve closure 7 cooperates to enable the gas to be shut off. This closure may be in the form of a disk.

My control device includes a holder for a thermostatic element and this holder is preferably in the form of a casing 8 of box form. That is to say, this casing is preferably of rectangular form so as to form a chamber 9 within it. Within this chamber 9, I provide a thermostatic element 10. This thermostatic element is preferably formed of a composite plate. That is to say, it is composed of an upper plate 11 and a lower plate 12. These plates are constructed of different metals or compositions. For the upper plate, I prefer to employ a relatively sensitive (to heat) material, that is to say, the upper plate is composed of a material that has a relatively high coefficient of expansion. For the lower plate 12, I prefer to employ a metal or composition having a relatively low coefficient of expansion. At ordinary temperatures the thermostatic plate 10 assumes a flat form. That is to say, it becomes a flat plate.

The thermostatic casing 8 is disposed adjacent to the flame of a pilot burner 13, which pilot burner connects with the valve 5 through a port at its lower end (see Fig. 1), and is provided with a small stopcock 14 for turning off the pilot burner at will. When the pilot burner 13 is lighted, the pilot flame raises the temperature of the casing 8 and by reason of this temperature, the plate 10 will assume a bowed form. At an intermediate point on its length and preferably at its middle point, this thermostatic plate 10 is connected by a stem to the valve closure 7. In the present instance, I employ a stem 15 which extends down through a tube 16 which I prefer to employ for connecting the casing 8 to the valve body.

In practice, the casing 8 is preferably disposed near the edge of the gas burner 2 so that the pilot can be located near enough to this burner to insure that it will light when the gas is turned on.

The casing 8 is preferably divided in a horizontal plane into a lower section 17 and an upper section 18. At the meeting plane 19 of these sections, the end walls 20 of the casing are provided with small recesses which cooperate to produce a socket 21 at each end of the chamber 9. The ends of the thermostatic element 10 are received loosely in these sockets 21 but they are not clamped or held in any way. The sockets simply operate to support the plate in the chamber and permit it to change its shape freely with changes in the temperature of the casing 8.

The sections of the casing 8 may be removably connected together by small machine screws 22 mounted at the corners of the casing, see Figure 3.

In the operation of this control device, if the flame at the pilot burner 13 becomes extinguished, for example, due to a wind storm or an accidental lowering in pressure of the gas or any other accident, the resulting change in temperature of the casing 8 will cause reduction in temperature of the thermostatic element 10, and this plate will become substantially straight and this will cause the closure 7 to close the port 6.

Although the interior of the casing 8 is in communication with the flowing gas, it is not cooled by the gas by reason of the fact that the stem 15 substantially fills the bore of the tube 16 and excludes the flowing gas from the casing.

My apparatus not only prevents dangerous explosions but also prevents waste of gas.

It is understood that the embodiment of the invention described herein is only one of the many embodiments this invention may take, and I do not wish to be limited in the practice of the invention, nor in the claims, to the particular embodiment set forth.

What I claim is:

1. In a pilot-controlled device for a gas burner, the combination of a normally lighted pilot burner, a gas-valve having a body with a port admitting gas to the pilot burner, a closure for the port, a thermostat located near the pilot frame, comprising a casing of box form having a chamber within the same, a connection connecting the middle portion of the casing to the valve-body, a thermostatic composite plate mounted in the chamber having means connected to its middle portion extending through said connection and connecting the thermostatic plate with the valve closure, said plate operating to assume a bowed form when the thermostat casing is subjected to the heat of the flame of the pilot burner, said thermostat casing having a relatively large radiating surface operating to effect the rapid cooling of the casing when the pilot burner is extinguished and thereby effect a straightening of the thermostatic plate operating to close the valve.

2. In a pilot-controlled device for a gas burner, the combination of a normally lighted pilot burner, a gas valve having a body with a gas port, a tube extending from the valve body, a thermostat having a casing with a chamber attached to the tube, a thermostatic composite plate mounted in the chamber of the casing, operating to assume a bowed form when the thermostat casing is subjected to the heat of the pilot flame, a stem attached to the thermostatic plate at an intermediate point on its length, extending down said tube and substantially filling the bore of the tube so as to substantially exclude the flowing gas from said chamber and a valve closure carried by the said stem adjacent the said port, said thermostatic plate operating to straighten when the thermostat casing cools and thereby move the closure to close the valve port.

3. In a pilot-controlled device for a gas burner, the combination of a normally lighted pilot burner, a gas-valve having a body with a gas port, a tube extending upwardly from the valve-body, a thermostat having a casing of box form with a chamber attached to the upper end of the tube, a thermostatic composite plate mounted in the chamber of the casing extending longitudinally in the same and operating to assume a bowed form when the thermostat casing is subjected to the heat of the pilot flame, a stem attached to the thermostatic plate at its middle points extending down through the tube, said stem substantially filling the bore of said tube so as to substantially exclude the flowing gas from said chamber and a valve closure carried by the lower end of the stem adjacent the said port, said thermostatic plate operating to straighten when the thermostat casing cools and thereby move the closure to close the valve port.

4. In a pilot-controlled device for a gas burner, the combination of a normally lighted pilot burner, a gas valve having a body with a gas port, a tube extending from the valve body, a thermostat having a casing in the form of a box divided in a horizontal plane into two sections, the lower section being attached to the tube, the end walls of said sections, in their meeting plane, having recesses, a thermostatic composite plate mounted in the chamber of the casing with its ends received in the said recesses and operating to assume a bowed form when the thermostat casing is subjected to the heat of the pilot flame, a stem attached to the thermostat plate at its middle point extending down through the tube, and a valve closure carried by the stem adjacent the said port, said thermostatic plate operating to straighten when the thermostat casing cools and thereby move the closure to close the valve port.

5. In a pilot-controlled device for a gas burner, the combination of a normally lighted pilot burner, a gas-valve having a body with a port and a closure for the port, a thermostat to be placed near the pliot flame, comprising a casing having a chamber within the same, a tubular connection connecting the middle portion of the casing to the valve body and capable of establishing communication between the interior of the casing and the interior of the valve-body, a thermostatic composite plate mounted in the thermostat casing, a valve stem connected to the composite plate at the middle of the composite plate, and attached to the valve closure, said thermostatic plate operating to assume a bowed form when the thermostat casing is subjected to the heat of the flame of the pilot burner, and operating to straighten when the pilot burner is extinguished and thereby move the closure to close the said port.

Signed at Los Angeles this 26 day of March 1927.

ALLEN F. KIPPER.